US011395975B2

(12) United States Patent  
Starker et al.

(10) Patent No.: US 11,395,975 B2  
(45) Date of Patent: Jul. 26, 2022

(54) BROADCAST-READY TABLE SPORTS SYSTEM

(71) Applicant: Thomas Charles Starker, Columbus, OH (US)

(72) Inventors: Thomas Charles Starker, Columbus, OH (US); Pamela I. Theodotou, London, OH (US)

(73) Assignee: Thomas Charles Starker, Columbus, OH (US)

( * ) Notice: Subject to any disclaimer, the term of this patent is extended or adjusted under 35 U.S.C. 154(b) by 218 days.

(21) Appl. No.: 16/857,671

(22) Filed: Apr. 24, 2020

(65) Prior Publication Data

US 2020/0338459 A1  Oct. 29, 2020

Related U.S. Application Data

(60) Provisional application No. 62/838,974, filed on Apr. 26, 2019.

(51) Int. Cl.
*A63F 13/86* (2014.01)
*A63F 7/06* (2006.01)
(Continued)

(52) U.S. Cl.
CPC ............ *A63F 13/86* (2014.09); *A63F 7/0017* (2013.01); *A63F 7/06* (2013.01); *A63F 7/0616* (2013.01);
(Continued)

(58) Field of Classification Search
None
See application file for complete search history.

(56) References Cited

U.S. PATENT DOCUMENTS 4,307,884 A   12/1981   Remmler et al.
6,773,010 B2   8/2004   Zucchi et al.
(Continued)

FOREIGN PATENT DOCUMENTS

DE   202014009583 U1   4/2016
EP       3372287 A1   9/2018
(Continued)

OTHER PUBLICATIONS

Notification of Transmittal with International Search Report and Written Opinion of the International Searching Authority for PCT Application No. PCT/US2020/029777; ISA/US; Commissioner for Patents; Alexandria, VA; dated Jul. 8, 2020.

*Primary Examiner* — Jason T Yen
(74) *Attorney, Agent, or Firm* — Thomas E. Lees, LLC

(57) ABSTRACT

In one example, a system includes a movable object, a detection region including a playing surface for supporting the movable object, and a plurality of cameras spaced apart from one another about the detection region, each of the plurality of cameras configured to capture a field of view of the detection region. The system may further include a controller configured to determine the position of the movable object on the playing surface. The cameras may be configured to track the movement of the movable object on the playing surface. The output from the camera may be selected based upon the movement of the movable object on the playing surface. Sensors may be provided to gather telemetry data of the system so as to provide analysis of the system. The system may be part of or be used with various table sports or table games.

30 Claims, 4 Drawing Sheets

(51) Int. Cl.
  *G06T 7/292* (2017.01)
  *G06T 7/70* (2017.01)
  *A63F 7/00* (2006.01)

(52) U.S. Cl.
  CPC ............ *A63F 7/0676* (2013.01); *G06T 7/292* (2017.01); *G06T 7/70* (2017.01); *A63F 2300/577* (2013.01); *G06T 2207/10016* (2013.01)

(56) References Cited

U.S. PATENT DOCUMENTS

| | | | |
|---|---|---|---|
| 6,854,728 | B2 | 2/2005 | Dister et al. |
| 7,474,983 | B2 | 1/2009 | Mazalek et al. |
| 7,611,417 | B2 | 11/2009 | Murrey et al. |
| 7,690,653 | B2 | 4/2010 | Simon |
| 7,789,390 | B2 | 9/2010 | Giegerich et al. |
| 8,302,965 | B2 | 11/2012 | Grant |
| 8,944,435 | B2 | 2/2015 | Kolb |
| 8,944,899 | B2 | 2/2015 | Arnone et al. |
| 9,044,665 | B2 | 6/2015 | Haase et al. |
| 9,185,361 | B2 | 11/2015 | Curry |
| 9,216,318 | B2 | 12/2015 | Raniere |
| 9,866,624 | B2 | 1/2018 | Brown et al. |
| 10,010,778 | B2 | 7/2018 | Marty et al. |
| 10,688,379 | B2 | 6/2020 | Stellenberg |
| 2006/0178178 | A1* | 8/2006 | Nebel ............ A63F 9/24 463/4 |
| 2009/0062003 | A1 | 3/2009 | Kerscher |
| 2010/0026809 | A1* | 2/2010 | Curry ............ H04N 5/222 348/157 |
| 2013/0181399 | A1 | 7/2013 | Stellenberg et al. |
| 2016/0037139 | A1* | 2/2016 | Bacus ............ F21V 7/005 348/157 |
| 2017/0043241 | A1 | 2/2017 | Bacus et al. |
| 2018/0091776 | A1* | 3/2018 | Trabert ............ H04N 7/181 |
| 2018/0304146 | A1 | 10/2018 | Dayal et al. |
| 2018/0322337 | A1 | 11/2018 | Marty et al. |
| 2019/0005774 | A1 | 1/2019 | Arnone et al. |
| 2020/0016479 | A1* | 1/2020 | Grant ............ A63F 7/0672 |

FOREIGN PATENT DOCUMENTS

| | | |
|---|---|---|
| WO | 2016034722 A1 | 3/2016 |
| WO | 2018163123 A1 | 9/2018 |

* cited by examiner

ND TABLE SPORTS
BROADCAST-READY TABLE SPORTS SYSTEM

CROSS-REFERENCE TO RELATED APPLICATIONS

This application claims the benefit of U.S. Provisional Patent Application Ser. No. 62/838,974, filed on Apr. 26, 2019, the disclosure of which is incorporated by reference herein in its entirety.

TECHNICAL FIELD

The present disclosure relates to systems using cameras to capture a field of a view of a detection region including a playing surface for supporting a movable object. Broadly, the present disclosure is applicable to video coverage (including live video coverage) of any event of interest to enhance and facilitate presentation of the event as a spectator event. In particular applications described herein, the foregoing may be applied to a variety of table games, such as, but not limited to, foosball or table soccer, air hockey, ping pong or table tennis, billiards, casino games (e.g., blackjack, poker, craps), puzzle games, and board games. More specifically, the devices, systems, and methods described herein may be particularly advantageous for use with events broadcasts, and/or streams that are not immediately amenable to a stadium setting or broadcast of a competition or other broadcast or show (e.g., TV show, reality TV show, teaching show, podcast).

BACKGROUND

Sports are a vital element of non-scripted television programming, especially on cable and satellite systems. Many of these sports have a playing field where the size and position of the players relative to the playing field allow the sport to be enjoyed in person by spectators and also allow the sport to be captured on camera for transmission to spectators in the form of home audiences.

At one point in time, growth of a sport, with its accompanying growth in revenues, was incumbent on the ability to attract an "in person" audience. While an "in person" audience is still an attractive feature, the real ability to grow a sport lies in the ability to give an "in person" experience to a remote audience of spectators. Jerry Jones, the owner of the Dallas Cowboys football team in the National Football League, has said that his biggest concern in the design of the Cowboys Stadium (now referred to as "AT & T Stadium") in 2009 was not the entertainment of the slightly more than 100,000 patrons that can be the "in person" audience. Instead, Jones insists, his biggest concern is the 100 million plus audience that can be entertained internationally through the broadcast media.

The broadcast media, fueled by advertising money, can expose players to a sport and attract the talented players, which can increase the competitiveness of the sport, by making it an "event," namely a spectator event.

Many table sports and table games enjoy wide familiarity, but they are primarily known as participation sports and not as spectator sports. Even in an "in person" setting, it is difficult for more than a few people to effectively watch certain table sports or table games competitions. A broadcast audience is essential to the advancement of a sport, such as inclusion of the sport in the Olympics. Through media attention and innovative techniques, the playing card game "Texas Hold'em" poker would be a more likely sport in a future Olympics than table soccer as it is currently positioned.

A viewing audience is particularly interested in the strategy, speed, and skill involved in a sport (including the ability to see detailed views of the playing surface, pieces, balls, players, and the like), yet these aspects are currently not captured adequately in the case of many table sports and table games. Further, the capture of these aspects should preferably be accomplished in a manner that does not detract from the ability of the players to perform or to materially change the operational features of the sports table itself.

As will now be appreciated, it would be desirable to provide greater access to various table sports and table games, namely by making the same readily viewable as a spectator event. It is therefore an object of the present disclosure to provide devices, systems, and methods that enhance the suitability of table sports and table games, and particularly, table soccer, as a spectator sport and, more particularly, to an audience viewing the sport through a broadcast medium. It is further an object of the present disclosure to provide devices, systems, and methods that enhance the suitability of other shows, events, broadcasts, and/or streams (e.g., spectator sports, table sports, table games, TV show, reality TV show, teaching show, podcast) for audience viewing (e.g., via television, broadcast, the Internet, streaming).

SUMMARY

In an example, a system comprises a movable object, a detection region, and a plurality of cameras. The detection region includes a playing surface for supporting the movable object. The plurality of cameras are spaced apart from one another about the detection region. Each of the plurality of cameras is configured to capture a field of view of the detection region.

Another example is a method. The method comprises a step of receiving, at a controller, an output from each of a plurality of cameras. The plurality of cameras are spaced apart from one another about a detection region. The detection region includes a table having a tabletop defining a playing surface for supporting a movable object. Each of the plurality of cameras is configured to capture a field of view of the detection region. The method further comprises a step of determining, at the controller, a first position of the movable object on the playing surface. The method further comprises a step of selecting a first one of the outputs from the plurality of cameras in response to determining the first position of the movable object. The selected first one of the outputs provides a field of view of the movable object at the first position. The method further comprises a step of determining, at the controller, a second position of the movable object on the playing surface. The second position is different from the first position. The method further comprises a step of selecting a second one of the outputs from the plurality of cameras in response to determining the second position of the movable object. The selected second one of the outputs is different than the selected first one of the outputs. The selected second one of the outputs provides a field of view of the movable object at the second position.

A further example is a system comprising a movable ball, a detection region, and a plurality of cameras. The detection region includes a table having a tabletop defining a playing surface for supporting the movable ball. The table further comprises first and second end walls spaced apart from one another and first and second side walls spaced apart from one another. The first and second end walls extend between and interconnect the first and second end walls at corners of the table, such that the playing surface is defined between the first and second end walls and the first and second side walls. The table further comprises a game rod passing through a bushing in the first side wall and having a rotatable paddle member affixed thereto. The bushing includes a sensor operatively coupled to a controller configured to determine at least one of a radial orientation, an axial orientation, and an angular velocity of the game rod. The plurality of cameras are spaced apart from one another about the detection region. Each of the plurality of cameras is configured to capture a field of view of the detection region

BRIEF DESCRIPTION OF THE DRAWINGS

The following description of the illustrative examples may be better understood when read in conjunction with the appended drawings. It is understood that potential examples of the disclosed systems and methods are not limited to those depicted.

DETAILED DESCRIPTION

Figure 1:
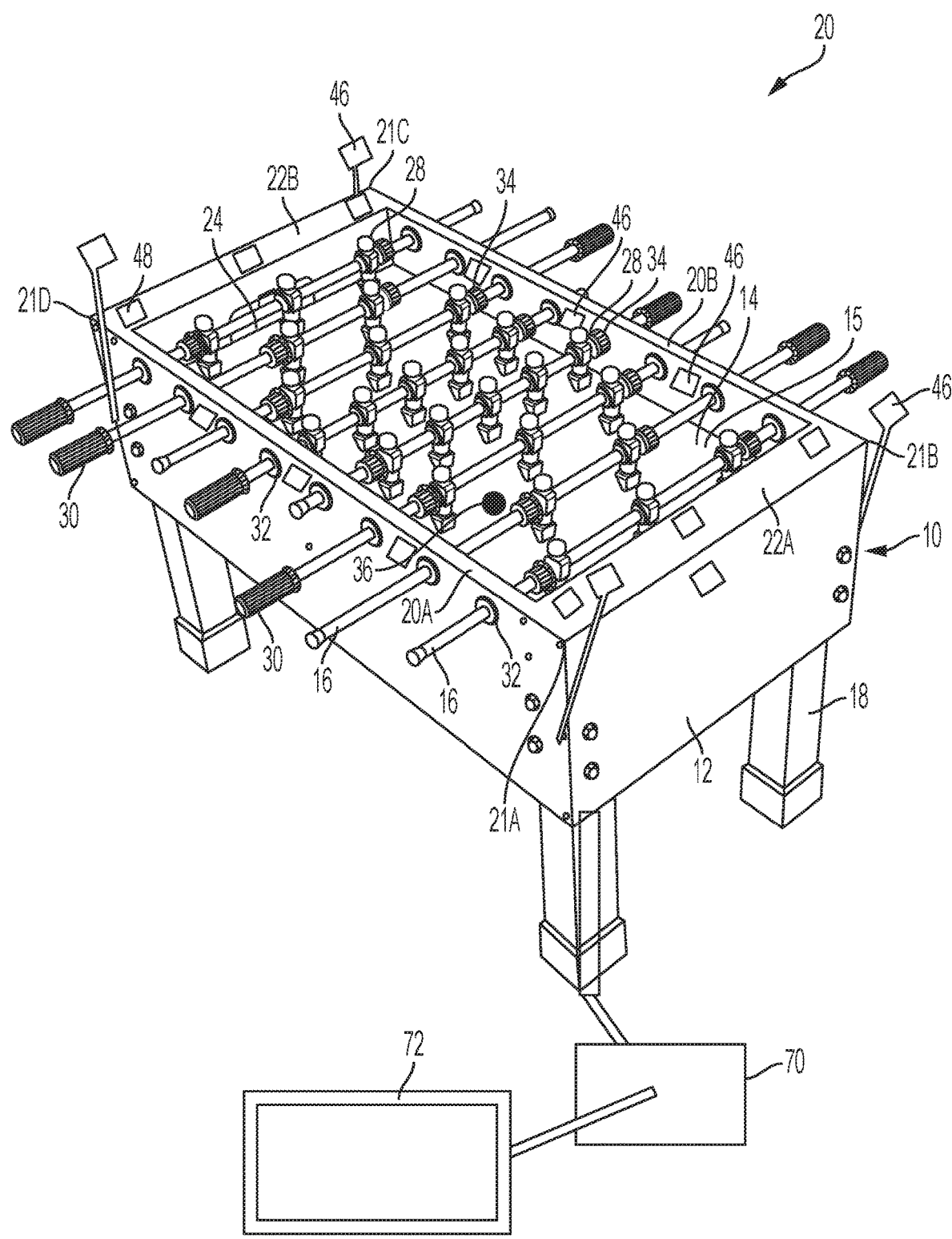
FIG. 1 shows a perspective view of a system according to one example including a foosball or table soccer device.

In the following detailed description, reference is made to the accompanying drawings, which form a part hereof. In the drawings, similar symbols identify similar components, unless context dictates otherwise. The illustrative examples described in the detailed description and drawings are not meant to be limiting and are for explanatory purposes. Other examples may be utilized, and other changes may be made, without departing from the spirit or scope of the subject matter presented herein. It will be readily understood that the aspects of the present disclosure, as generally described herein and illustrated in the drawings, may be arranged, substituted, combined, and designed in a wide variety of different configurations, each of which are explicitly contemplated and form a part of this disclosure.

It should be noted that some of the terms used herein may be relative terms. For example, the terms "upper" and "lower" are relative to each other in location, i.e. an upper component is located at a higher elevation than a lower component in a given orientation, but these terms may change if the device is flipped. An intermediate component, on the other hand, is always located between an upper component and a lower component regardless of orientation. The terms "horizontal" and "vertical" are used to indicate direction relative to an absolute reference, i.e. ground level. However, these terms should not be construed to require structures to be absolutely parallel or absolutely perpendicular to each other. For example, a first vertical structure and a second vertical structure are not necessarily parallel to each other. The terms "top" and "bottom" or "base" are used to refer to surfaces where the top is always higher than the bottom/base relative to an absolute reference, i.e. the surface of the earth. The terms "upwards" or "upwardly" and "downwards" or "downwardly" are also relative to an absolute reference; upwards is always against the gravity of the earth. The term "parallel" should be construed in its lay sense of two surfaces that maintain a generally constant distance between them, and not in the strict mathematical sense that such surfaces will never intersect when extended to infinity. The words "proximal" and "distal" generally refer to positions or directions toward and away from, respectively, another position, such as a user of the inserts, spray tips, or biomaterial delivery devices described herein. The words "longitudinal," "radial," and "transverse" designate directions in the drawings to which reference is made. The term "substantially" is intended to mean considerable in extent or largely but not necessarily wholly that which is specified. The terms "operative to" and "adapted to" and similar terms are used herein to describe that a particular component has certain structural features designed to perform a designated function. Such components should be construed as having the expressed structure, with the designated function being considered part of the structure. The terminology includes the above-listed words, derivatives thereof and words of similar import.

Unless explicitly stated otherwise, each numerical value and range should be interpreted as being approximate as if the word "about," "approximately," or "substantially" preceded the value or range. The terms "about," "approximately," and "substantially" can be understood as describing a range that is within 15 percent of a specified value unless otherwise stated.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more examples or that one or more examples necessarily include these features, elements and/or steps. The terms "comprising," "including," "having," and the like are synonymous and are used inclusively, in an open-ended fashion, and do not exclude additional elements, features, acts, operations, and so forth.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

It will be understood that reference herein to "a" or "one" to describe a feature such as a component or step does not foreclose additional features or multiples of the feature. For instance, reference to a device having or defining "one" of a feature does not preclude the device from having or defining more than one of the feature, as long as the device has or defines at least one of the feature. Similarly, reference herein to "one of" a plurality of features does not foreclose the inclusion of two or more, up to all, of the features. For instance, reference to a device having or defining "one of a X and Y" does not foreclose the device from having both the X and Y.

While conventional systems for table sports and table games have been adequate for their intended purposes, there is a need for a system that allows such table sports or table games to be readily viewed (e.g., in real-time) as spectator events broadcasts, and/or streams. There is also a need for a system with cameras that are capable of capturing fields of view of maximum interest (e.g., by tracking movement of the ball, equipment, or players). Still further yet, there is a need for a system capable of providing analysis of the event (e.g., in real-time or after an event).

The devices, systems, and methods of the present disclosure can be used in a variety of applications as will be readily appreciated by those skilled in the art. By way of non-limiting example, it is contemplated that the foregoing may be used with any number of table sports or table games, such as foosball or table soccer, air hockey, billiards, ping pong or table tennis, casino games, puzzles, and board games.

FIG. 1 shows a perspective view of a first example system 20 according to the present disclosure. In this exemplary embodiment, system 20 includes a known foosball or table soccer device 10. The foosball device 10 generally includes a table 12 supported by a plurality of legs 18 that raise the table 12 to a suitable playing height. The table 12 is further defined by a first end wall 22A spaced apart from a second end wall 22B and a first side wall 20A spaced apart from a second side wall 20B. As can be seen, the first and second side walls 20A, 20B generally extend between and interconnect the first and second end walls 22A, 22B at corners 21A-D of the table 12. In particular, the first and second end walls 22A, 22B and the first and second side walls 20A, 20B generally surround a tabletop 15 of the table 12. The tabletop 15 defines a playing surface 14 for supporting one or more movable objects thereon. For example, the playing surface 14 generally supports at least a movable ball 36.

The table 12 further includes a plurality of game rods 16. Each of the game rods 16 generally passes through a pair of bushings 32. More particularly, each game rod 16 passes through one bushing 32 in the first side wall 20A and another bushing 32 in the second side wall 20B. At least one paddle member 28 (and, more preferably, two or more paddle members) is affixed to each game rod 16 between the first and second side walls 20A, 20B. The paddle member 28 is generally rigidly mounted to the game rod 16. Each game rod 16 generally extends across and beyond the playing surface and terminate in a hand grip 30 along one end thereof. Typically, there are eight game rods 16 provided, four of which are controlled by the user or users representing each of the "teams" in the game. Each game rod 16 passes through a bushing 32 at each of the first and second side walls 20A, 20B, with the game rod 16 freely rotatable in the bushing. Each game rod 16 also is mounted for a limited amount of axial travel in the bushings 32, delimited by bumpers 34 mounted on the game rod 16. As the movable game rod 16 is rotated, the movable paddle member(s) 28 are able to contact the movable ball 36 that is in play, with the object of directing the game ball towards and into a goal region 24 being defended by the other "team." One goal region is generally provided centrally in each of the first and second end walls 22A, 22B. A ball entry hole (not shown) may also be provided centrally in each of the first and second side walls 20A, 20B.

Moving from the goal region 24 being defended by one of the "teams" towards midfield, the defensive "team" controls the first two game rods 16 nearest its goal, with three paddles 28 deployed on the first of these and two paddles deployed on the second. The third game rod 16, controlled by the offensive "team," has three paddles 28 for attacking the goal opening 24. The fourth game rod 16, controlled by the defensive "team," has five paddles 28 deployed to strike the game ball 36 in the midfield area. The remaining four rods 16 are deployed in a mirror image manner at the other end of the playing field 14. Of course, this description is of the game as presently played and could be subject to rule changes by a sanctioning body for the competition.

As the players or "teams" will position themselves during game play along the respective first and second side walls 20A, 20B of the table 12, important viewing angles for spectators are obstructed. Therefore, a first object of the present disclosure is to modify the table 12 by installing a plurality of cameras 46. The cameras 46 are generally spaced apart from one another about a detection region. Each of the cameras generally captures a different field of view of the detection region, including a field of view that may partially overlap with a field of view captured by an adjacent camera. The detection region may generally be considered to include the system and any area around the system that is desired to be captured. For example, in one non-limiting example, the detection region may include the table 12 and the players or "teams" positioned about the table 12.

Each of the cameras 46 are configured to capture a field of view of the detection region. Each of the cameras 46 may be configured to capture a partially-overlapping field of view of the detection region. Each of the cameras may further be configured to comprehensively capture the detection region. In particular embodiments, the cameras may be arranged such that each camera has a partially overlapping field of view with one or more adjacent cameras to facilitate collection of images or videos sharing overlapping portions which can be merged by matching portions of different images or videos to provide a comprehensive capture of the detection region, namely the playing surface 14.

As depicted in FIG. 1, the cameras 46 may generally be spaced about the table 12. In particular embodiments, at least one camera 46 can be positioned on or embedded in the first side wall 20A and positioned so as to capture a field of view of the playing surface 14. Similarly, at least one camera 46 can be positioned on or embedded in one or more of the second side wall 20B, the first end wall 22A, and/or the second end wall 22B. In particular, a plurality of cameras 46 are generally provided in each of the first and second side walls 20A, 20B and the first and second end walls 22A, 22B so as to comprehensively capture the playing surface 14. In general, each camera 46 is positioned in a direction toward the playing surface 14 so as to capture a field of view of at least a portion of the playing surface 14. As will be appreciated by those skilled in the art, any number or type of camera 46 may be employed for a desired application. In the exemplary embodiment described herein, there is generally at least one camera 46 positioned between each of the game rods 16 so as to provide many different fields of view of the playing surface 14 for capturing dynamic shots of the playing surface 14.

With continued reference to FIG. 1, each of the corners 21A-D of the table 12 may include a camera 46 affixed thereto. The cameras 46 affixed to the corners 21A-D of the table 12 are positioned so as to capture a field of view of the playing surface 14. In some embodiments, the cameras 46 affixed to the corners 21A-D of the table 12 may be angled down toward the playing surface 14 from above the first and second end walls 22A, 22B. Cameras 46 can be further positioned in other locations to capture other various aspects of the detection region and/or table 12 as desired. For example, it is specifically contemplated that one or more cameras 46 can be positioned so as to capture a field of view including at least a hand of a player contacting the game rod 16. Such a field of view may be captured, for example, my providing cameras 46 in each of the legs 18 of the table 12 and positioned and directed so as to capture the players' hands. Such a field of view may be particularly interesting to spectators of a foosball or table soccer event. Moreover, it is contemplated that one or more cameras 46 can be disposed within the ball entry holes and/or the goal regions 24 so as to capture a field of view of ball entry hole, goal region 24, and/or the playing surface 14.

In certain embodiments, a camera may also be embedded within the movable ball 36 so as to show a field of view from the movable ball 36 as it moves about the playing surface 14. Positioning the cameras 46 about the table 12 allows a viewer (e.g., of a broadcast of the vent) to effectively "stand" immediately next to the playing surface 14 without actually being physically present within the detection region and without obstructing or otherwise disrupting the event. This provides an immersive experience for the viewer, thereby making the event a spectator event. These immersive views permit the viewer to view angles and fields of view of the event where no attendee would be permitted or capable of standing.

Figure 2:
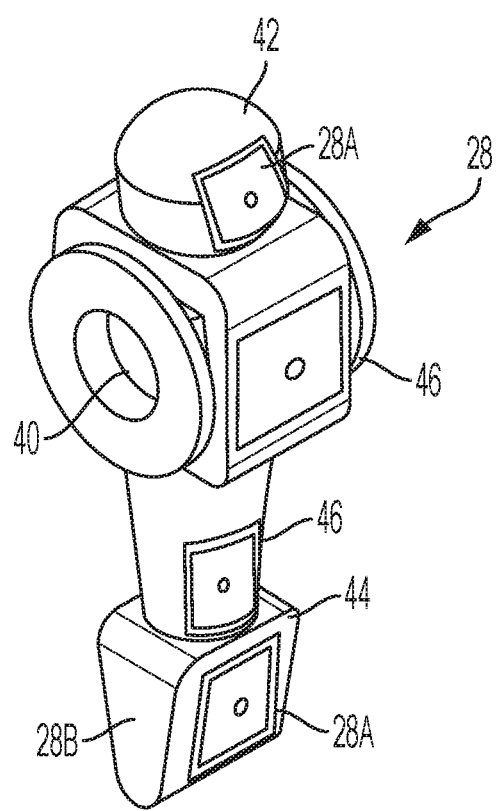
FIG. 2 shows a perspective view of a paddle member of the foosball or table soccer device of FIG. 1 according to one example.

Turning now to FIG. 2, an example paddle member 28 is illustrated. The paddle member 28 may include a through-hole 40 that allows a game rod to pass through the paddle member. As shown with reference back to FIG. 1, the game rod 16 generally passes through the paddle member 28 at "shoulder" height, with a "head" portion 42 of the paddle member 28 positioned on one side of the through-hole 40 and a "leg" portion 44 on the opposite side of the through-hole 40. Generally, the leg portion 44 extends far enough below the through-hole 40 to allow the leg portion 44 to contact a game ball 46 in play. On the other hand, the head portion 42 is generally unable to contact the game ball 46, even when the paddle member 28 is inverted with the head portion 42 below the game rod.

Presently, sporting events, gaming events, broadcasts, and/or streams are typically captured using cameras that are positioned away from the event or playing surface so as to provide a "birds-eye" or point of view of the playing surface. In specific embodiments of the present disclosure, on the other hand, one or more cameras 46 may also be positioned on or embedded within one or more of the paddle members 28. For example, a camera 46 may be positioned along or within the leg portion 44 of the paddle member 28 so as to capture a field of view of the playing surface 14. Alternatively, or in addition thereto, a camera 46 may be positioned proximate the through-hole 40 of the paddle member 28 so as to capture a field of view of the playing surface 14. Similarly, as will be appreciated, a camera could likewise be positioned on the head portion 42 of the paddle member 28. Employing one or more cameras on or within the paddle member 28 allows a viewer (e.g., of a broadcast of the event) to effectively "stand" on the playing surface 14 without actually being physically present within the detection region and without obstructing or otherwise disrupting the event. These immersive views permit the viewer to view angles and fields of view of the event where no attendee would be permitted or capable of standing. Such camera angles may be particularly advantageous for entertainment viewing purposes and for capturing shots for instant replay or highlight reels. As will be appreciated by those skilled in the art, other cameras or camera angles such as those provided by the systems, devices, and methods disclosed herein may be used for entertainment viewing purposes and for capturing shots for instant replay or highlight reels.

With continued reference to FIG. 2, an exterior surface 28B of the paddle member 28 may include on or more indicia 28A thereon. For example, an indicia 28A in the form of a dot or other distinguishing feature may be provided on the leg portion 44 of the paddle member 28. Alternatively, or in addition thereto, an indicia 28A on the head portion 42 of the paddle member 28. Other movable objects of the system (e.g., the movable ball 36, the game rods 16) may include similar indicia in the form of a dot or other distinguishing feature. In embodiments in which the paddle members 28 include distinguishing indicia 28A, it is specifically contemplated that since all of the paddle members 28 on a given game rod 16 and/or all of the paddle members 28 belonging to a specific player or "team" may include the same indicia thereon. In particular embodiments in which the game ball 36 is provided with a distinguishing indicia thereon, it is contemplated that the indicia on the ball will be distinguishable from the indicia on the paddle members and/or game rods.

In specific embodiments, the players or "teams" can also be fitted with cameras. For example, each player could have a camera attached to themselves in a non-obtrusive manner so as to capture a point-of-view of the player as the game is played.

As described above, the exact number and location of the cameras 46 for capturing images or video of the detection region can be varied as desired to suit particular applications. Generally, the cameras 46 are designed so as to withstand typical impact that may occur during the table sport or table game. For example, in the illustrated foosball or table soccer example, the cameras 46 should generally be designed to withstand ordinary impact and are designed so as not to interfere with or affect performance of the game in its usual fashion (e.g., by embedding the cameras into the side and end walls).

The type of cameras 46 used in the devices, systems, and methods described herein can be varied as desired to suit particular applications. Suitable cameras for use with the present disclosure include ENG (Electronic News Gathering) video cameras, EFP (Electric Field Production) cameras, fixed cameras, fixed wireless cameras, hand-held cameras, hand-held wireless cameras, mini POV cameras, lipstick cameras, slow motion cameras, skycams, cablecams, pole cameras, stabilized cameras, specialty cameras, pop-up cameras, cone cameras, 360° cameras, virtual reality cameras, and combinations thereof. Generally, the cameras 46 employed in the present disclosure are in fixed positions, but still possess the ability to pivot the lens as necessary (e.g., side-to-side, pan up-and-down in an X-Y plane, tilt in a Z-plane) to capture different fields of view.

In order to provide a more immersive experience for spectators, microphones 48 may also be positioned about the detection region. In some embodiments, the cameras 46 themselves may include microphones. Alternatively, or in addition thereto, stand-alone microphones may be employed to capture audio in the detection region. The exact number and location of the microphones 48 for capturing audio in the detection region can be varied as desired to suit particular applications.

In any of these circumstances, it is desirable to the connect the outputs of the cameras 46, microphones 48, and/or lights 47 to a controller unit 70 and to power them from a power supply 72. It is an object of the present disclosure to provide a broadcast-ready system without materially changing the game table device, or, in the alternative, to be able to enhance the ability to broadcast the game where the game table device has been modified with cameras and/or microphones.

Figure 3:
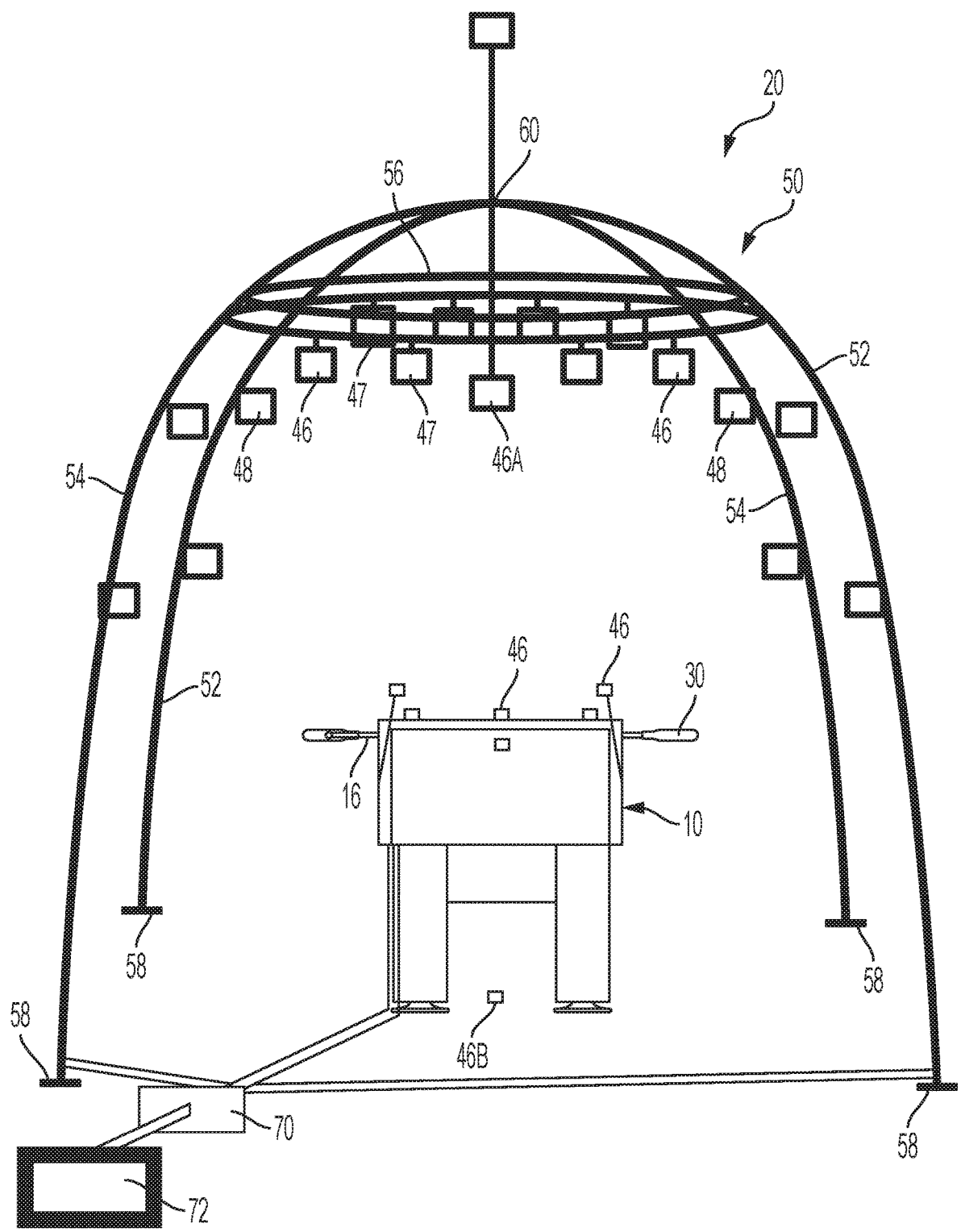
FIG. 3 shows an end elevation view of a system according to one example including a foosball or table soccer device and a frame positioned over the foosball or table soccer device.
Figure 4:
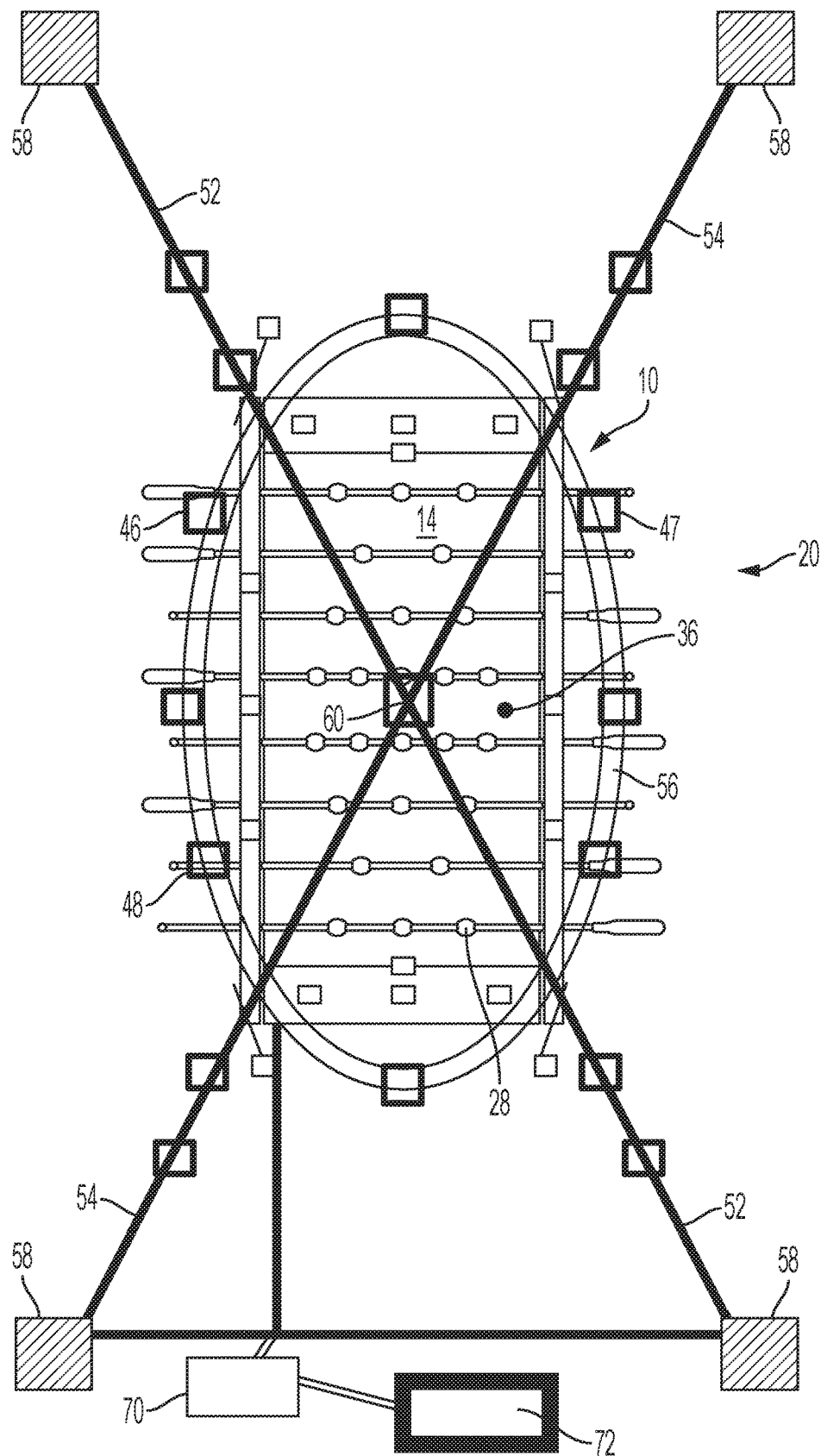
FIG. 4 shows a top plan view of the system of FIG. 3 according to one example.

Turning now to FIG. 3 and FIG. 4, the system 20 can be seen to include the foosball or table soccer device 10 as previously described in addition to a frame 50 positioned spaced apart from the table 12 of the device 10. Generally, the frame 50 is positioned about the table 12. In embodiments, the frame 50 may rest upon the same surface as the table 12 (e.g., the ground) span the entirety of the table 12 and define a footprint that is larger than the table 12. In other embodiments, the frame 50 may be suspended above the table 12 and define a footprint that is smaller than, equal to, or larger than the table 12 as may be desired to suit particular applications.

In FIG. 3 and FIG. 4, frame 50 is depicted, for purposes of non-limiting illustration only, as generally resting upon the same surface as the table 12 (e.g., the ground) and spanning the entirety of the table 12 and defining a footprint that is larger than the table 12. In particular, the footprint of frame 50 is sufficiently large to allow free movement of the players of the game device 10. In this exemplary embodiment, frame 50 is positioned over the table 12. In the depicted embodiment, the frame 50 comprises first and second arcuate members 52, 54 and an oval member 56. Each end of the arcuate members 52, 54 has a foot 58 to provide the frame 50 with a stable base. In certain embodiments, the frame 50 may be broken down into its individual pieces to be transported or stored. As depicted, the assembled frame 50, viewed from above in FIG. 4, provides a rectangular footprint that exceeds the rectangular footprint of the table 12. The arcuate members 52, 54 may be connected to one another at a point 60 that can be, for example, centered over a center of the playing surface 14. In addition to other functions, the oval member 56 may connect to the arcuate members 52, 54, thereby providing stability to the frame 50. As shown in FIG. 4, the oval member 56 may be sized to project an oval footprint onto the table 12 that at least partially, and preferably at least substantially, covers the playing surface 14. As best seen in FIG. 3, the oval member 56 may be mounted on the arcuate members 52, 54 so that the oval member 56 lies in a plane parallel to a plane of the playing surface 14.

As seen with reference to FIG. 3 and FIG. 4, any desired number of cameras 46 may be affixed to the frame 50 and arranged and positioned so as to capture a field of view of the detection region, namely the playing surface 14. Additionally, microphones 48 and lights 47 may be similarly arranged about the frame 50 to capture audio and provide lighting for the table 12, respectively. In certain embodiments, the cameras 46, lights 47, and microphones 48 may be affixed to the frame 50 in such a way as to be movably aimed toward the playing surface 14. \

As can be best seen in FIG. 3, the cameras 46 can include an overhead camera 46A that is affixed to the frame 50 above the playing surface 14. In certain embodiments, the overhead camera 46A can depend directly down from the center point 60 of the frame 50 so as to be positioned directly above a center point of the playing surface 14 and positioned and directed so as to capture a field of view of the playing surface 14. The overhead camera 46A and/or any one or more of the other cameras 46 may be configured to track movement of various movable object(s) on the playing surface 14. In one non-limiting example, the overhead camera 46A and/or any one or more of the other cameras 46 may be configured to track movement of the movable ball 36 (e.g., by tracking movement of indicia on the movable ball). In another non-limiting example, the overhead camera 46A and/or any one or more of the other cameras 46 may be configured to track movement of the paddle members 28 (e.g., by tracking movement of indicia on the paddle members), including axial and radial movement of the paddle members 28. In any of these foregoing embodiments, the overhead camera 46A and/or any one or more of the other cameras 46 configured to track movement of movable object(s) on the playing surface 14 may desirably continuously track such movable object so as to continuously capture a field of view of the movable object.

As can be further seen in FIG. 3, the cameras 46 can include a camera 46B positioned below the playing surface 14. This camera 46B can be positioned and directed upward toward the playing surface 14. In such embodiments, at least the playing surface 14 may be at least partially transparent. In embodiments, the lower face of the playing surface may be at least one-way transparent to the camera 46B such that the camera 46B is capable of capturing a field of view of the playing surface 14 from below the playing surface 14. The opposite top face of the playing surface 14 could be non-transparent. For example, the playing surface 14 could be constructed with a one-way reflective material such that the playing surface 14 is opaque when viewed from the top surface (i.e., in the direction into the page in FIG. 4) but transparent when viewed from the bottom surface (i.e., in the opposite direction). The playing surface 14 could, in some embodiments, be configured to include field lines, logos, or other graphics printed, applied, projected, or otherwise provided thereon. In embodiments, the playing surface 14 may be constructed from a material that is at least semi-transparent, such as Plexiglas.

The camera 46A, the camera 46B, and/or one or more of the other cameras 46 may be configured as 360-degree panoramic cameras. Moreover, the camera 46A, the camera 46B, and/or one or more of the other cameras 46 may be configured to provide an immersive experience or virtual reality experience to a remote viewer. For example, using camera 46A, camera 46B, and/or one or more of the other cameras 46, virtual attendance can be simulated either during the event or in an immersive replay. While the cameras 46 are generally positioned and directed so as to capture a field of view of the playing surface 14, the entire detection region may be captured so as to enable a remote viewer to view other aspects (e.g., the crowd, the players or "teams"). In such virtual reality applications, the remote viewer could be effectively "immersed" in the event by use of, for example, a worn virtual reality display over both eyes and optionally headphones over the viewer's ears so as to provide the viewer with full audio-visual senses occurring at the event.

As shown in FIGS. 1-4, the outputs from all elements (cameras, microphones, lights) are operatively connected to the controller 70 and powered by a power supply 72.

While the foregoing detailed description illustrates the equipment and methods needed to make a table soccer game device broadcast-ready, the equipment and methods are not limited to the particular game of table soccer. It is applicable to other table sports, including, for example only, air hockey. While air hockey has a playing field of similar size and shape, the players will tend to position themselves behind the respective goals rather than along the side edges. As the only elements affecting movement of the puck are the walls of the playing field and the paddle used by each player, the telemetry is more easily tracked. Further, the paddles have only two-dimensional movement, since there are no game rods in air hockey to rotate the paddles. In fact, it is believed that the inventive concept here may be extended to other table sports, particularly where the competition is effectively limited to a playing field contained on the game device.

To assist in allowing table sports or table games to be readily viewed (e.g., in real-time) as spectator events, broadcasts, and/or streams and, more specifically, to enable the cameras 46 to capture fields of view of maximum interest, the controller 70 may be configured to determine the position of movable objects on the playing surface 14. For example, the controller may be configured to determine the position of the ball, the equipment, or the players. In the illustrated embodiment of a foosball or table soccer table, the controller may particularly be configured to determine the position of any one or more of the movable ball 36, the game rod(s) 16, the paddle member(s) 28, or any other movable objects, including the players' hands. In particular, the system may be configured so as to continuously determine and track the movement of the movable object(s). The controller may employ any of a variety of known methods or equipment for determining the position of the movable object(s). By way of non-limiting example, the position of the movable object(s) may be determined, for example, using telemetry. By way of non-limiting example, the position of the movable object(s) may be determined using a variety of devices, such as one or more transmitters, sensors, transceivers, transponders, accelerometers, and RADAR positioning devices. These devices can be positioned as desired within or outside the detection region. In addition or alternatively to the foregoing, infrared video-based tracking devices and methods may be employed to aid in determining the position of the movable object(s). Other methods for determining the position of the movable object(s) include, but are not limited to, digital signal processing (DSP) image processing methods, LIDAR, and SONAR positioning methods. Other image processing methods or determining the position of the movable object(s) include, but are not limited to, triangulation. In exemplary embodiments, the position of the movable object(s) is determined in real-time (i.e., as the event is occurring). Based upon the determined position of the movable object(s) camera selection and field of view selection can be made so as to capture and broadcast fields of view of maximum interest (i.e., fields of view continuously capturing a field of view of the movable object). In such embodiments, one or more of the cameras (such as overhead camera 46A illustrated in FIG. 3), can be configured as a tracking camera. Such tracking camera(s) may be operatively coupled to the controller and configured to track movement of the movable object(s) on the playing surface. In this way, the tracking camera(s) may be configured to continuously capture a field of view of the movable object(s). In more specific embodiments in which the movable object(s) include tracking indicia thereon, as described above, the tracking camera(s) may be configured to track movement of the movable object(s) on the playing surface by tracking movement of the indicia thereon. In particular embodiments in which multiple tracking cameras are employed, each of the movable objects or groups or sets of the movable objects may have distinguishing indicia, as described above, and each of the tracking cameras may be configured to track movement of a specific one or specific group or set of the movable objects. Put another way, in one specific, non-limiting example, a first one of the tracking cameras (such as overhead camera 46A illustrated in FIG. 3) may be configured to track movement of the movable ball 36 (e.g., by tracking movement of indicia thereon or communicating with a sensor therein or thereon), while another one or more of the other cameras 46 may be configured to track movement of other movable objects (e.g., the game rods 16, paddle members 28, players), such as by tracking movement of indicia thereon or by communication with a sensor thereon or therein. Regardless of the specific tracking or position determination methods used, it is to be understood that such tracking or position determination methods should generally be capable of operating independently of the shape or size of the playing surface 14.

In one example, a plurality of transmitters (e.g., three or more transmitters) may be spaced apart from one another and from the movable object. Each of the transmitters can be configured, as described herein, to transmit a signal that at least partially traverses the detection region. In a non-limiting example, the signals may be acoustics signal that are transmitted to the movable object(s). In this regard, the movable object(s) may include a sensor configured to receive the signals from the transmitters. The controller may be configured to determine the position of the movable object(s) on the playing surface 14 based on the signals from the transmitters.

As will now be readily understood, determining the position of the movable object(s) of the present disclosure at a given point in time can be very advantageous and provide for more dynamic spectator viewing. In certain embodiments, the movable object(s) of the present disclosure, in addition to or alternatively to the use of indicia as previously described, may include positioning devices. For example, the movable ball 36, the game rod 16, the paddle member 28, and/or other movable elements of the present disclosure may be constructed so as to include a position sensor therein or thereon.

By way of non-limiting example, a transceiver or accelerometer may be embedded in the movable ball 36. The circuitry of the position sensor may be configured to transmit and/or receive signals to the controller 70. For example, the controller may use the time it takes signals to travel to and from the ball 36, the velocity of the ball 36, and/or the acceleration of the ball 36 to determine the position of the ball 36 on the playing surface 14. Generally, the position sensor is designed so as to withstand typical impact that may occur during the table sport or table game. For example, in the illustrated foosball or table soccer example, the position sensor in the movable ball 36 should generally be designed to withstand ordinary impact with the side walls, end walls, and paddle members. Additionally, the position sensor in the movable ball 36 should generally be designed so as not to affect performance of the game in its usual fashion. In particular applications, it may be desirable to employ multiple signals or data positioning points (e.g., three or more signals), such that the three-dimensional space occupied by the ball 36 can be determined. Those skilled in the art will readily appreciate and understand how such sensors, transmitters, transceivers, and circuitry is provided in view of the present disclosure.

In addition to or alternatively to providing one or more position sensors in the movable ball 36, other movable object(s) of the system may include sensors. In certain embodiments, the system may be capable of gathering telemetry data of one or more movable objects of the system. In one example, the system may be capable of gathering telemetry data of the game rods 16 and paddle members 28 affixed thereto. For example, the bushings 32 in each of the first and second side walls 20a, 20b through which the game rods 16 pass may employ known sensor technology. In certain embodiments, the bushings 32 can include a sensor operatively coupled to the controller 70 configured to determine the radial orientation, axial orientation, and/or angular velocity of a corresponding one of the game rods 16. A particular advantage of obtaining this information is to be able to provide analysis of the game play, especially after a game. Put another way, this information may be particularly useful to a player of the game in refining strategy or technique. Additionally, outputs received from the sensor of the busing 32 could be broadcast for spectators to view, such as by displaying the torque, speed, power, or other measure with which a player has acted upon the game rod 16. Similar telemetry sensors could likewise be employed in the hand grips 30, movable ball 36, goal regions 24, or other areas of the system. In this regard, telemetry is a key factor in many sports including modern motor racing, baseball, and golf where speed is an important factor. The system of the present disclosure may capture telemetry in several different ways which will be used to calculate important match data and player stats. By way of non-limiting example, for the foosball or table soccer application illustrated in the drawings, data that can be collected and broadcast includes: sensors and/or tracking may capture and record ball speed, measurements of handle spin and speed may capture torque and velocity data allowing for analysis of different types of shots and player specific data, and sensors in the paddle members may capture torque, speed, and striking power translated to the ball. Currently, these stats and related player performance data is not tracked in foosball or table soccer.

In one non-limiting example, the system may include a controller operatively coupled to at least two transmitters. The transmitters may be spaced apart from one another and from the movable object(s). The transmitters may be configured to emit timed acoustic signals that at least partially traverse the detection region. More specifically, the acoustic signals emitted by the transmitters my be configured to at least partially traverse the tabletop 15 of the table 10. The movable object(s) (e.g., the movable ball 36) may include an acoustic signal sensor that receives the acoustic signals emitted by each of the transmitters. Based on these signals received at the movable object(s), the movable object(s) or the controller may determine the times of arrival of each of the acoustic signals. The arrival time data may be used to determine "time of flight" travel times for each acoustic signal, which can then be used to determine the distance between the transmitters and the movable object(s). Using triangulation, the location of the movable object(s) can then be estimated or determined.

As will now be appreciated by those skilled in the art, while the systems, devices, and methods of the present disclosure have been described with particular reference to capturing a live competition and making the same broadcast-ready, the present disclosure is additionally particularly advantageous for capturing practices or other events in which it is desirable to comprehensively capture such event. By way of non-limiting example, it is contemplated that players of various table sports and table games would find it very beneficial to be able to capture themselves practicing, including capturing multiple different angles and fields of view, which would be useful in refining technique or strategy. Similarly, the sensing and analyzing techniques described herein could be equally advantageous for such players to analyze their gameplay and refine or better understand technique and strategy. In this regard, it is specifically contemplated that the systems, devices, and methods disclosed herein can be readily adapted for both broadcast and non-broadcast applications. For example, it is specifically contemplated that a non-broadcast version could be useful for at-home use to permit a player to capture any desired angles and fields of view (e.g., to assist the player in analyzing their gameplay and refining or better understanding technique and strategy). Such non-broadcast versions may, in particular applications, include a memory and/or storage from which the captured footage can be retrieved and viewed.

Determining the position of the movable object(s) on the playing surface, and in particular the movable ball, may enable automatic camera selection so as to track the movable object as it moves about the playing surface, thereby enabling the capture of more dynamic views. In one example, an output is received (e.g., at controller 70) from each of the plurality of cameras 46 space about the detection region. A first position of the movable object may then be determined (e.g., by controller 70) as previously described. In response to determining the first position of the movable object, a first one of the outputs from the plurality of cameras can be selected that provides a field of view of the movable object in the first position. Thereafter, a second position of the movable object may then be determined (e.g., by controller 70) as previously described. In response to determining the second position of the movable object, a second (e.g., different) one of the outputs from the plurality of cameras can be selected that provides a field of view of the movable object in the second position. In this way, camera selection can be dynamically and automatically controlled so that camera views of the movable object as it moves about the playing surface can be continuously captured and broadcast for dynamic viewing of the event. In embodiments, the controller receives all of the camera outputs from the plurality of cameras and receives and/or determines the position of the movable object on the playing surface and then decides, based upon the position information, which camera output to select for broadcast or display. In response to updated position information (i.e., when the movable object is determined to have moved from one position to another), the system may automatically and dynamically select a different camera output so as to provide a continuous and real-time display and broadcast of a field of view including the movable object.

In examples described herein, information indicating the position of the movable ball on the playing surface may be used to select an appropriate camera output from one of the multiple cameras. In short, based upon the determined position of the movable ball and/or other movable object on the playing surface, automatic decisions may be made with respect to camera selection (including decisions as to whether to switch to a different camera), shot types, and angles. That is, based upon the determined position of the ball and/or other movable object on the playing surface, the system may automatically make decisions with respect to which camera to use (camera selection) and how to direct camera, such as by dynamically altering the pan, tilt, zoom, and/or focus of the field of view.

As described herein, the system generally makes the use of a plurality of spaced-apart cameras so that the viewer has a comprehensive view of the event. Ideally, the system would include enough cameras that the event can be viewed from virtually any point of view, including those that would not actually be possible for a spectator physically at the event. This allows the system to capture and broadcast the event in an immersive and comprehensive manner.

As will further be appreciated, the camera selection techniques described herein provide a system using hardware, software, or a combination thereof to select specific cameras, angles, or types of cameras to capture specific fields of view based on where movable object(s) (e.g., the ball, equipment, or players) are positioned on the playing surface. This provides a distinct advantage over current systems and techniques that rely on camera operators to manually select which camera feed and field of view to use at a given point during the event. In such current systems, and techniques, the exact positioning of the movable object(s) at a given point in time can be difficult to predict, thereby making the capability to capture such movable object(s) difficult due to inherent drawbacks associated with the reaction times of camera operators. As a consequence, many sporting, gaming events, broadcasts, and/or streams are displayed using EWS (Extremely Wide Shot) or VWS (Very Wide Shot) fields of view with "birds-eye view" camera angles. While such fields of view and camera angles have been satisfactory for their intended purpose, certain table sports and table games do not lend themselves well to such fields of view or camera angles. Therefore, the movable object location determination and camera selection techniques of the present disclosure enable new possibilities for viewing and broadcasting these table sports and table games. Determining the location of movable object(s) on the playing surfaces provides new and valuable information about the table sports or table games that is presently absent. This position information makes the table sport or table game more predictable for camera selection and spectator viewing of important fields of view. In addition, the techniques described herein minimize the disadvantageous delay between movement of the movable object(s) on the playing surface and the specific camera, angle, or field of view chosen for broadcasting. At least partially because of this latency minimization, a wider range of more detailed or maximized fields of view previously considered impossible can now be captured and broadcast for spectator enjoyment. As a result, in addition to or alternatively to the traditional EWS or VWS fields of view with "birds-eye view," more dynamic and maximized fields of view may be captured and broadcast, such as dynamic or panning shots of the players' faces, hands, or movements, in addition to quick movement of the movable object(s).

While certain configurations of structures have been illustrated for the purposes of presenting the basic structures of the present disclosure, one of ordinary skill in the art will appreciate that other variations are possible which would still fall within the scope of the appended claims. Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

Various aspects of the present disclosure can be understood in view of the following examples:

Example 1

A system, comprising:
a movable object;
a detection region including a playing surface for supporting the movable object; and
a plurality of cameras spaced apart from one another about the detection region, each of the plurality of cameras configured to capture a field of view of the detection region.

Example 2

The system of Example 1, further comprising a table having a tabletop defining the playing surface, the table further comprising:
first and second end walls spaced apart from one another;
first and second side walls spaced apart from one another and extending between and interconnecting the first and second end walls at corners of the table, such that the playing surface is defined between the first and second end walls and the first and second side walls.

Example 3

The system of Example 2, wherein each of the first and second end walls and first and second side walls includes one of the plurality of cameras embedded therein and positioned so as to capture a field of view of the playing surface.

Example 4

The system of Example 2, wherein each of the corners includes one of the plurality of cameras affixed thereto and positioned so as to capture a field of view of the playing surface.

Example 5

The system of Example 2, wherein the table includes a game rod passing through the first side wall and having a rotatable paddle member affixed thereto.

Example 6

The system of Example 5, wherein the paddle member includes one of the plurality of cameras embedded therein and positioned so as to capture a field of view of the playing surface.

Example 7

The system of Example 5, wherein at least one of the plurality of cameras is positioned so as to capture a field of view including at least a hand of a player contacting the game rod.

Example 8

The system of Example 5, wherein each of the first and second end walls includes a goal region, each goal region including one of the plurality of cameras disposed therein and positioned so as to capture a field of view of the playing surface.

Example 9

The system of Example 1, further comprising a rigid frame positioned over the table, wherein at least one of the plurality of cameras is affixed to the frame and is positioned so as to capture a field of view of the detection region.

Example 10

The system of Example 9, wherein at least one of the plurality of cameras is affixed to the frame directly above a center of the playing surface and positioned so as to capture a field of view of the playing surface.

Example 11

The system of Example 1, wherein:
the playing surface is at least partially transparent; and
at least one of the plurality of cameras is located below the playing surface and is positioned so as to capture a field of view of the playing surface through the playing surface.

Example 12

The system of Example 1, further comprising a controller spaced apart from the movable object, the controller configured to determine the position of the movable object on the playing surface.

Example 13

The system of Example 12, wherein at least one of the plurality of cameras is a tracking camera configured to track movement of the movable object on the playing surface and wherein the controller is configured to cause the tracking camera to continuously capture a field of view of the movable object.

Example 14

The system of Example 13, wherein the movable object includes an indicia on an exterior surface thereof and the tracking camera is configured to track movement of the movable object on the playing surface by tracking movement of the indicia.

Example 15

The system of Example 12, further comprising:
a plurality of transmitters spaced apart from one another and from the movable object, each of the plurality of transmitters configured to send a signal that at least partially traverses the detection region;
wherein the movable object includes a sensor configured to receive the signal from each of the plurality of transmitters; and
wherein the controller is configured to determine the position of the movable object on the playing surface based on the signal from each of the plurality of transmitters.

Example 16

The system of Example 15, wherein at least one of the plurality of cameras is a tracking camera configured to track movement of the movable object on the playing surface and wherein the controller is configured to cause the tracking camera to continuously capture a field of view of the movable object.

Example 17

The system of Example 1, wherein each of the plurality of cameras is configured to capture a partially-overlapping field of view of the detection region.

Example 18

The system of Example 1, wherein the plurality of cameras are configured to comprehensively capture the detection region.

Example 19

The system of Example 2, wherein the table is a foosball or table soccer table.

Example 20

The system of Example 2, wherein the table is an air hockey table.

Example 21

The system of Example 2, wherein the table is a billiards table.

Example 22

The system of Example 2, wherein the table is a ping pong or table tennis table.

Example 23

The system of Example 2, wherein the table is a casino table.

Example 24

The system of Example 2, wherein the table is configured to support a puzzle thereon.

Example 25

The system of Example 2, wherein the table is configured to support a board game thereon.

Example 26

The system of Example 12, wherein the controller is configured to determine the positions of a plurality of distinct movable objects on the playing surface.

Example 27

The system of Example 26, wherein one of the plurality of cameras is a first tracking camera configured to track movement of a first of the plurality of movable objects on the playing surface and another of the plurality of cameras is a second tracking camera configured to tracking movement of a second of the plurality of movable objects on the playing surface and wherein the controller is configured to cause the first and second tracking cameras to continuously capture a field of view of the first and second movable objects, respectively.

Example 28

The system of Example 27, wherein the first movable object includes an indicia on an exterior surface thereof and the first tracking camera is configured to track movement of the first movable object on the playing surface by tracking movement of the indicia thereon, and wherein the second movable object includes an indicia on an exterior surface thereof and the second tracking camera is configured to track movement of the second movable object on the playing surface by tracking movement of the indicia thereon.

Example 29

The system of Example 15, wherein each of the plurality of transmitters is configured to send an acoustic signal and wherein the movable object includes an acoustic sensor configured to receive the acoustic signal from each of the plurality of transmitters.

Example 30

A method, comprising:
receiving, at a controller, an output from each of a plurality of cameras spaced apart from one another about a detection region including a table having a tabletop defining a playing surface for supporting a movable object, each of the plurality of cameras configured to capture a field of view of the detection region; and
determining, at the controller, a first position of the movable object on the playing surface;
in response to determining the first position of the movable object, selecting a first one of the outputs from the plurality of cameras, the selected first one of the outputs providing a field of view of the movable object at the first position;
determining, at the controller, a second position of the movable object on the playing surface, the second position being different from the first position; and in response to determining the second position of the movable object, selecting a second one of the outputs from the plurality of cameras, the selected second one of the outputs being different than the selected first one of the outputs and providing a field of view of the movable object at the second position.

Example 31

A system, comprising:
a movable ball;
a detection region including a table having a tabletop defining a playing surface for supporting the movable ball, the table further comprising:
first and second end walls spaced apart from one another;
first and second side walls spaced apart from one another and extending between and interconnecting the first and second end walls at corners of the table, such that the playing surface is defined between the first and second end walls and the first and second side walls;
a game rod passing through a bushing in the first side wall and having a rotatable paddle member affixed thereto, the bushing including a sensor operatively coupled to a controller configured to determine at least one of radial and axial orientation of the game rod and angular velocity thereof; and
a plurality of cameras spaced apart from one another about the detection region, each of the plurality of cameras configured to capture a field of view of the detection region.

Example 32

A system as described herein, wherein the system is configured as a broadcast system configured for broadcast of at least one of the captured fields of view of the detection region.

Example 33

The system of Example 32, wherein the system is further configured to broadcast at least one of instant replay and highlights of the captured fields of view of the detection region.

Example 34

A system as described herein, wherein the system is configured as an at-home version configured for playback of at least one of the captured fields of view of the detection region.

Example 35

The system of Example 34, wherein the system is further configured to store at least one of the captured fields of view of the detection region in at least one of a storage and a memory from which the at least one of the captured fields of view can be retrieved and played back.

It should be noted that the illustrations and descriptions of the examples shown in the figures are for exemplary purposes only and should not be construed limiting the disclosure. One skilled in the art will appreciate that the present disclosure contemplates various examples. Additionally, it should be understood that the concepts described above with the above-described examples may be employed alone or in combination with any of the other examples described above. It should further be appreciated that the various alternative examples described above with respect to one illustrated example can apply to all examples as described herein, unless otherwise indicated.

While certain examples have been described, these examples have been presented by way of example only and are not intended to limit the scope of the present disclosure. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the present disclosure. The accompanying claims and their equivalents are intended to cover such forms or modifications as would fall within the scope and spirit of the present disclosure.

What is claimed:
1. A system comprising:
a movable object;
a detection region including a playing surface for supporting the movable object;
a plurality of cameras spaced apart from one another about the detection region, each of the plurality of cameras configured to capture a field of view of the detection region; and
a table having a tabletop defining the playing surface, the table further comprising:
first and second end walls spaced apart from one another; and
first and second side walls spaced apart from one another and extending between and interconnecting the first and second end walls at corners of the table, such that the playing surface is defined between the first and second end walls and the first and second side walls;

wherein:
the table includes a game rod passing through the first and second side walls and having a rotatable paddle member affixed thereto between the first and second side walls; and
the paddle member includes one of the plurality of cameras embedded therein and positioned so as to capture a field of view of the playing surface.

2. The system of claim 1, wherein each of the first and second end walls includes a goal region, each goal region including one of the plurality of cameras disposed therein and positioned so as to capture a field of view of the playing surface.

3. The system of claim 1, further comprising a rigid frame spaced apart from the table, wherein at least one of the plurality of cameras is affixed to the frame and is positioned so as to capture a field of view of the detection region.

4. The system of claim 3, wherein at least one of the plurality of cameras is affixed to the frame directly above a center of the playing surface and positioned so as to capture a field of view of the playing surface.

5. The system of claim 1, further comprising a controller spaced apart from the movable object, the controller configured to determine the position of the movable object on the playing surface.

6. The system of claim 5, wherein at least one of the plurality of cameras is a tracking camera configured to track movement of the movable object on the playing surface and wherein the controller is configured to cause the tracking camera to continuously capture a field of view of the movable object.

7. The system of claim 5, further comprising:
a plurality of transmitters spaced apart from one another and from the movable object, each of the plurality of transmitters configured to send a signal that at least partially traverses the detection region;
wherein the movable object includes a sensor configured to receive the signal from each of the plurality of transmitters; and
wherein the controller is configured to determine the position of the movable object on the playing surface based on the signal from each of the plurality of transmitters.

8. The system of claim 1, wherein each of the first and second end walls and first and second side walls includes one of the plurality of cameras embedded therein and positioned so as to capture a field of view of the playing surface.

9. The system of claim 1, wherein each of the corners includes one of the plurality of cameras affixed thereto and positioned so as to capture a field of view of the playing surface.

10. The system of claim 1, wherein the table includes a game rod passing through the first and second side walls and having a rotatable paddle member affixed thereto between the first and second side walls.

11. A system comprising:
a movable object;
a detection region including a playing surface for supporting the movable object;
a plurality of cameras spaced apart from one another about the detection region, each of the plurality of cameras configured to capture a field of view of the detection region; and
a table having a tabletop defining the playing surface, the table further comprising:
first and second end walls spaced apart from one another; and
first and second side walls spaced apart from one another and extending between and interconnecting the first and second end walls at corners of the table, such that the playing surface is defined between the first and second end walls and the first and second side walls;
wherein:
the table includes a game rod passing through the first and second side walls and having a rotatable paddle member affixed thereto between the first and second side walls; and
the table further comprises a plurality of legs, each of the plurality of legs including one of the plurality of cameras positioned so as to capture a field of view including at least a hand of a player contacting the game rod.

12. The system of claim 11, wherein each of the first and second end walls and first and second side walls includes one of the plurality of cameras embedded therein and positioned so as to capture a field of view of the playing surface.

13. The system of claim 11, wherein each of the corners includes one of the plurality of cameras affixed thereto and positioned so as to capture a field of view of the playing surface.

14. The system of claim 11, wherein each of the first and second end walls includes a goal region, each goal region including one of the plurality of cameras disposed therein and positioned so as to capture a field of view of the playing surface.

15. The system of claim 11, further comprising a rigid frame spaced apart from the table, wherein at least one of the plurality of cameras is affixed to the frame and is positioned so as to capture a field of view of the detection region.

16. The system of claim 15, wherein at least one of the plurality of cameras is affixed to the frame directly above a center of the playing surface and positioned so as to capture a field of view of the playing surface.

17. The system of claim 11, further comprising a controller spaced apart from the movable object, the controller configured to determine the position of the movable object on the playing surface.

18. The system of claim 17, wherein at least one of the plurality of cameras is a tracking camera configured to track movement of the movable object on the playing surface and wherein the controller is configured to cause the tracking camera to continuously capture a field of view of the movable object.

19. A system comprising:
a movable object;
a detection region including a playing surface for supporting the movable object;
a plurality of cameras spaced apart from one another about the detection region, each of the plurality of cameras configured to capture a field of view of the detection region;
wherein:
the playing surface is at least partially transparent; and
at least one of the plurality of cameras is located below the playing surface and is positioned so as to capture a field of view of the playing surface from below the playing surface.

20. The system of claim 19, further comprising a controller spaced apart from the movable object, the controller configured to determine the position of the movable object on the playing surface.

21. The system of claim 20, wherein at least one of the plurality of cameras is a tracking camera configured to track movement of the movable object on the playing surface and wherein the controller is configured to cause the tracking camera to continuously capture a field of view of the movable object.

22. A system comprising:
a movable object;
a detection region including a playing surface for supporting the movable object;
a plurality of cameras spaced apart from one another about the detection region, each of the plurality of cameras configured to capture a field of view of the detection region; and
a controller spaced apart from the movable object, the controller configured to determine the position of the movable object on the playing surface;
wherein:
at least one of the plurality of cameras is a tracking camera configured to track movement of the movable object on the playing surface and wherein the controller is configured to cause the tracking camera to continuously capture a field of view of the movable object; and
the movable object includes an indicia on an exterior surface thereof and the tracking camera is configured to track movement of the movable object on the playing surface by tracking movement of the indicia.

23. The system of claim 22, wherein each of the plurality of cameras is configured to capture a partially-overlapping field of view of the detection region.

24. The system of claim 22, wherein the plurality of cameras is configured to comprehensively capture the detection region.

25. The system of claim 22, further comprising a table having a tabletop defining the playing surface, the table further comprising:
first and second end walls spaced apart from one another; and
first and second side walls spaced apart from one another and extending between and interconnecting the first and second end walls at corners of the table, such that the playing surface is defined between the first and second end walls and the first and second side walls.

26. A system comprising:
a movable object;
a detection region including a playing surface for supporting the movable object;
a plurality of cameras spaced apart from one another about the detection region, each of the plurality of cameras configured to capture a field of view of the detection region;
a controller spaced apart from the movable object, the controller configured to determine the position of the movable object on the playing surface; and
a plurality of transmitters spaced apart from one another and from the movable object, each of the plurality of transmitters configured to send a signal that at least partially traverses the detection region
wherein:
the movable object includes a sensor configured to receive the signal from each of the plurality of transmitters;
the controller is configured to determine the position of the movable object on the playing surface based on the signal from each of the plurality of transmitters; and
at least one of the plurality of cameras is a tracking camera configured to track movement of the movable object on the playing surface and wherein the controller is configured to cause the tracking camera to continuously capture a field of view of the movable object.

27. The system of claim 26, wherein each of the plurality of cameras is configured to capture a partially-overlapping field of view of the detection region.

28. The system of claim 26, wherein the plurality of cameras are configured to comprehensively capture the detection region.

29. The system of claim 26, further comprising a table having a tabletop defining the playing surface, the table further comprising:
first and second end walls spaced apart from one another; and
first and second side walls spaced apart from one another and extending between and interconnecting the first and second end walls at corners of the table, such that the playing surface is defined between the first and second end walls and the first and second side walls.

30. A method, comprising:
receiving, at a controller, an output from each of a plurality of cameras spaced apart from one another about a detection region including a table having a tabletop defining a playing surface for supporting a movable object, each of the plurality of cameras configured to capture a field of view of the detection region; and
determining, at the controller, a first position of the movable object on the playing surface;
in response to determining the first position of the movable object, selecting a first one of the outputs from the plurality of cameras, the selected first one of the outputs providing a field of view of the movable object at the first position;
determining, at the controller, a second position of the movable object on the playing surface, the second position being different from the first position; and
in response to determining the second position of the movable object, selecting a second one of the outputs from the plurality of cameras, the selected second one of the outputs being different than the selected first one of the outputs and providing a field of view of the movable object at the second position.

* * * * *